United States Patent [19]

Simms

[11] 3,892,582
[45] July 1, 1975

[54] PROCESS FOR CHANGING THE TINT OF A PHOTOCHROMIC MATERIAL AND MATERIAL FORMED THEREBY

[76] Inventor: Robert A. Simms, 449 Ithaca Rd., Horseheads, N.Y. 14845

[22] Filed: Feb. 1, 1974

[21] Appl. No.: 438,838

[52] U.S. Cl. .......................... 106/52; 65/30; 65/32; 106/DIG. 6
[51] Int. Cl. ............................................... C03c 3/20
[58] Field of Search ............. 65/30, 32, 33, DIG. 2; 161/6, 31, 3.5; 264/1; 106/52, DIG. 6

[56] References Cited
UNITED STATES PATENTS

| | | | |
|---|---|---|---|
| 2,649,387 | 8/1953 | Parsons et al. | 65/DIG. 2 |
| 3,231,456 | 1/1966 | McMillian | 65/30 X |
| 3,325,299 | 6/1967 | Araujo | 65/30 X |
| 3,420,698 | 1/1969 | Smith | 65/30 X |

*Primary Examiner*—Robert L. Lindsay, Jr.
*Attorney, Agent, or Firm*—Sughrue, Rothwell, Mion, Zinn & Macpeak

[57] ABSTRACT

The tint of a photochromic material is changed without degradation in photochromic properties by heating the material in a reducing atmosphere. The resulting material is also described.

10 Claims, 1 Drawing Figure

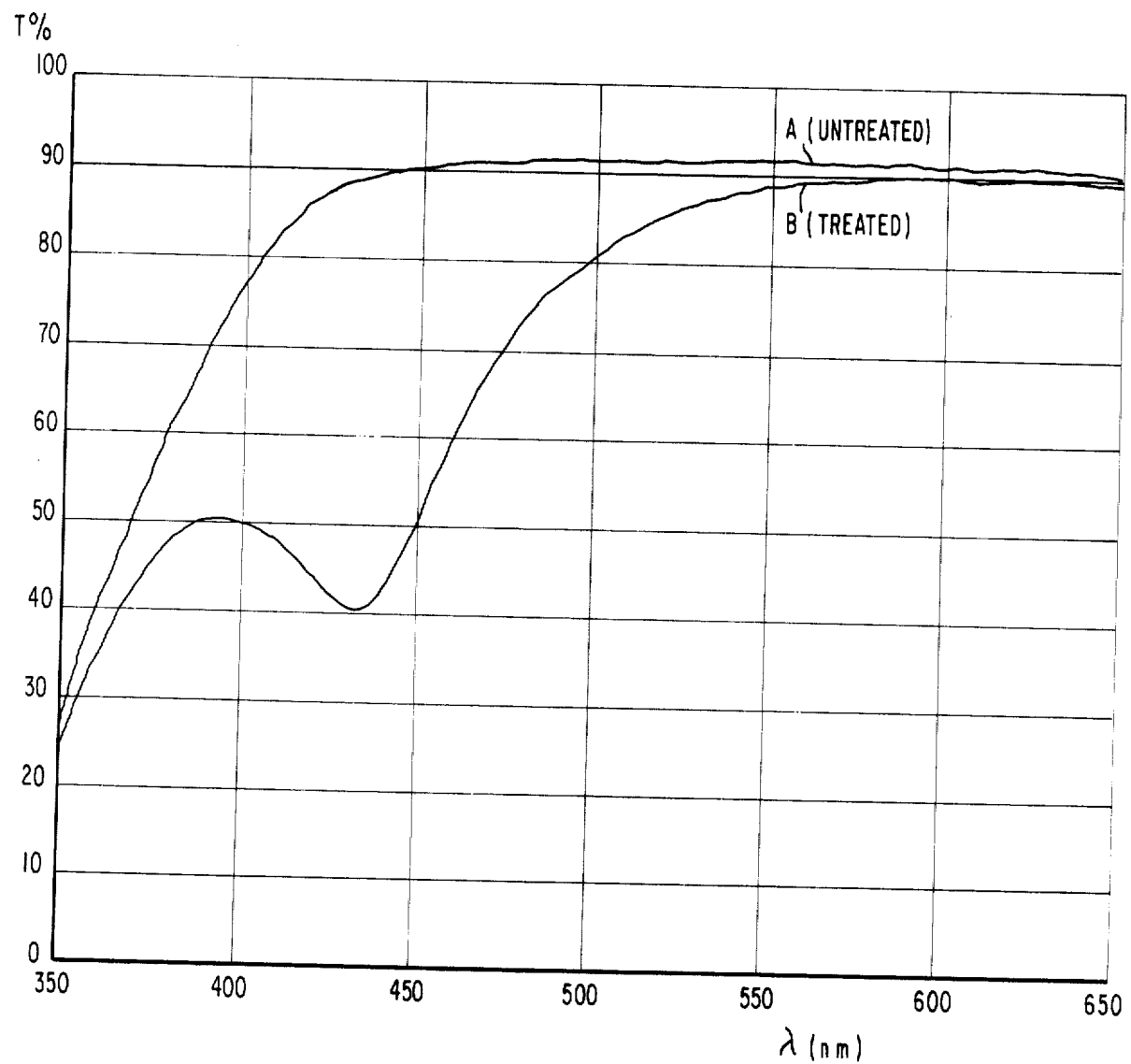

PROCESS FOR CHANGING THE TINT OF A PHOTOCHROMIC MATERIAL AND MATERIAL FORMED THEREBY

BACKGROUND OF THE INVENTION

1. Field of the Invention

The present invention relates to processes for changing the tint of a photochromic material and the material thus formed.

2. Description of the Prior Art

Recently compositions have been developed which exhibit photochromic properties, i.e., their optical transmittance varies reversibly with the intensity of actinic radiation incident thereon.

Many photochromic compositions are substantially colorless or at best have a slight color when in the unexcited state. Coloring material is not often added to photochromic compositions because of a decrease in the intensity of the photochromic change which may be caused thereby. There thus remains a substantial unmet demand for photochromic compositions of varying tints to meet various user requirements.

Although many photochromic materials are known, extensive development work has been done on the photochromic glasses. One of the original patents in this area is U.S. Pat. No. 3,208,860 (Armistead et al). This patent describes inorganic silicate glasses containing sub-microscopic crystals of silver halides which darken in color when the glass is subjected to actinic radiation but which regain their original color when the actinic radiation is removed. The glasses described in Armistead et al are essentially colorless.

U.S. Pat. No. 3,449,103 (Stookey) is an improvement on the basic Armistead et al patent, and provides a process for increasing the concentration of extremely fine-grained silver halide crystals in the photochromic glass of Armistead et al by a rapid chilling of a melt of the photochromic glass during its formation.

U.S. Pat. No. 3,306,833 (O'Leary) is a further improvement upon the disclosure of Armistead et al, suggesting that the phototropic properties of the Armistead et al glasses can be improved by subjecting the glass bodies to exposure of X-rays or gamma-rays before or during the customary heat treating step in the formation of the glass.

British Pat. Specification No. 1,021,597 (Corning Glass Works) also relates to photochromic glasses of the type described in Armistead et al, and suggests that such glasses can be improved by doping with cadmium oxide.

U.S. Pat. No. 3,615,771 (Meiling) discloses photochromic glasses within the $CdO-B_2O_3-SiO_2$ field, describing the photochromic glasses as essentially free from fatigue.

U.S. Pat. No. 3,617,316 (Suzuki) et al discloses photochromic glasses comprising a borate glass body containing microcrystals of a silver halide and copper oxide and a process for forming such glasses. The glasses are completely colorless or, at most, tinged with a very light yellow color. Copper oxide is a mandatory constituent which imparts photosensitivity to the photochromic glasses.

German Offenlegungsschrift No. 2,107,343 discloses colored photochromic glasses comprising a silver halide containing borosilicate or borate glass containing minor proportions of vanadium, chromium, manganese and/or cobalt in an electropositive valence state.

Russian Pat. No. 224,022 discloses that the photochromic characteristics of a photochromic glass can be improved by gamma irradiation prior to the customary heat treatment of the photochromic glass.

Belgian Pat. Abstract No. 692,626 discloses photochromic glasses which have a faintly yellowish color.

U.S. Pat. No. 3,269,847 and U.S. Pat. No. 3,278,319, both in the name of Cohen, disclose photochromic glasses comprising, respectively, europium and cerium in the lower valency form. The glasses are formed in the presence of carbon (strong reducing conditions) in the melt stage. In the former patent, the higher the concentration of europium the more yellow is the unirradiated glass; this patent also discloses that the photochromic glass can be resensitized by high energy ultraviolet irradiation.

Ceramics, Vol. 68, 1968, page 10405, 107544m discloses the production of a photochromic glass and indicates that by melting in a reducing atmosphere the photochromic properties of the glass disappear. This article also discloses that upon irradiation with ultraviolet radiation Ag and Cl are formed and darkening of the glasses occurs.

All of the above references disclose photochromic glass compositions amenable to processing in accordance with the present invention, and are hereby incorporated by reference in toto.

The majority of the above references do not deal with aftertreatments for formed photochromic glasses, rather, they deal with the formation of bulk quantities of a photochromic glass. None of the above reference suggest that the tint of a photochromic article can be changed without substantial degradation of the photochromic properties thereof.

U.S. Pat. No. 3,464,806 (Seki et al) discloses that metallized ceramic bodies can be obtained by causing metal oxides in a glass body to migrate from the glass body to the surface thereof during devitrification and then reducing the migrated metal oxide to the metal form on the glass body surface.

SUMMARY OF THE INVENTION

It has now been discovered that the tint of a photochromic material can be permanently changed by heating the photochromic material in a reducing atmosphere.

Since many photochromic materials are substantially colorless in the unexcited state, the process of the present invention can be used to provide a permanent tint to such materials not only in the unexcited state but in the excited state.

For those photochromic materials which are inherently colored, even in the unexcited state, the process of the present invention can be applied to permanently change the tint of such materials, not only in the unexcited state but in the excited state.

It is thus one object of the present invention to provide photochromic materials of varying tints.

It is a further object of the present invention to provide photochromic articles of varying tints.

Still yet a further object of the present invention is to provide a process for changing the tint of a photochromic material or photochromic article without substantial changes in the photochromic properties of the material or article.

A specific object of the present invention is to provide photochromic glasses and photochromic glass articles of varying tints.

These and other objects of the present invention will be better understood from the following discussion.

BRIEF DESCRIPTION OF THE DRAWING

The drawing is a plot of percent transmittance versus exposing wavelength for an untreated photochromic article and a photochromic article treated in accordance with the present invention.

DETAILED DESCRIPTION OF THE INVENTION

The present invention finds application with photochromic materials which undergo a transmissivity change upon exposure to visible light in general, including not only photochromic glasses but also photochromic plastic materials and the like.

The process of the present invention is applicable to photochromic materials in general due to the basic mechanism of the process of the present invention. More specifically, in almost all photochromic materials there is an excess of the active photochromic element present, e.g., in Armistead et al glasses an excess of silver halide. While this excess does not harm the photochromic material, it provides no substantial increase in the photochromic effect. The reduction process of the present invention most preferably acts only on this excess active photochromic element since tinting is thus achieved without any substantial degradation in photochromic properties. However, it should be understood that this is not a mandatory bound on the present invention and, in fact, the reduction process of the present invention can be used to reduce active photochromic elements which is not considered excess as explained above. In this latter case, however, a slight decrease in photochromic properties will be exhibited. Many users will find the tinting effect of the process of the present invention to be so valuable, however, that they will accept not only a slight but a substantial decrease in photochromic properties to obtain a tinted photochromic material.

The present invention finds special application with photochromic glasses for two reasons: Firstly, photochromic glasses are today much more popular than photochromic plastics; secondly, photochromic glasses generally easily withstand the heating temperatures of the present invention, whereas special care must be taken in processing photochromic plastics so that they are not degraded at the heating temperatures of the present invention.

Preferred photochromic glasses are those disclosed in the Armistead et al and Stookey patents heretofore cited, i.e., inorganic silicate glasses containing submicroscopic particles of silver halide.

Photochromic articles in any form can be processed in accordance with the present invention, for example, in prescription and non-prescription eyeglasses which automatically become sunglasses when the wearer goes outside, specialized eyeglasses such as shooter's glasses, automobile windshields which darken and fade in response to sunlight, in lenses and filters required in optical instruments such as in cameras and the like, in building materials which regulate the amount of light which can enter a building, e.g., windows in homes, and the like.

One of the most important aspects of the present invention is that the tint of a photochromic article can be changed or darkened without any substantial harmful impact upon the photochromic properties of the article. Thus, without any degradation in the photochromic properties one can obtain a wide spectrum of desired tints in accordance with the present invention, for example, inherently colorless photochromic materials can be tinted pink, yellow, light brown, dark brown, etc., and photochromic materials which are inherently colored can be changed to a deeper tint or tone or the color thereof changed, and little, if any, loss of intensity or rapidity of the photochromic change is encountered.

The processing conditions of the present invention will now be discussed in detail.

Heating in a Reducing Atmosphere

The exact identity of the reducing atmosphere is not overly critical (so long as it is gaseous at the processing temperature, of course), and reducing atmospheres as are commonly used in the art can be used with success in the present invention. The reducing gas used must, of course, have a higher free energy of formation than that of visible light required to effect the transmissivity change in the photochromic material undergoing processing, e.g., greater than on the order of about 1½ to about 2 electron volts.

On a commercial scale, cost and safety are the primary factors in selecting the reducing atmosphere, and preferred reducing gases comprise hydrogen, carbon monoxide, cracked ammonia and the like, which can be used in pure form or in an inert carrier gas.

Considering practical availability, usually hydrogen will be the reducing atmosphere used. While pure hydrogen can be used, in light of the danger of explosion and the relatively high cost thereof as compared to many inert carrier gases, generally the hydrogen will be used in combination with an inert gas carrier. Although one can, if desired, use exotic inert gases such as argon, neon and the like, for practical purposes the inert gas used will almost always be nitrogen, considering the cost and availability thereof. One should, of course, insure that oxygen is kept out of the system of the present invention to avoid the danger of explosion, even if an inert gas carrier is used.

There is no special criticality regarding the ratio of reducing gas to inert gas carrier (if such is used) from the viewpoint of the process mechanism. However, at extremely low proportions of reducing gas the process time is increased without attendant benefit in results, which is economically undesirable. Balancing all factors, a 5% hydrogen/95% nitrogen (by volume) reducing atmosphere has been found to offer excellent results at reasonable processing times without undue costs or safety hazards, and such is most preferred for use in the process of the present invention.

Other reducing gas-inert carrier gas combinations are generally used in similar proportions. So long as the tinting effect of the present invention is achieved, little is gained by using greater amounts of reducing gas, though process time will be slightly decreased.

The process of the present invention can be practiced in a batch, semi-continuous or continuous manner. However, considering the danger of hydrogen build-up if hydrogen is used as the active reducing component and the desire to avoid temperature variations over the photochromic article being processed, it is most simple to practice the process of the present invention by flowing the reducing atmosphere over the photochromic articles under a slight positive pressure in either a semi-continuous or continuous system.

In such systems the general rule is that excess reducing atmosphere is used to constantly flush the processing apparatus (avoiding the presence of undesired gases such as oxygen), avoid hot-spots on the surface of the photochromic article at the article/reducing atmosphere interface and to insure that the desired reducing effect is obtained. To avoid highly turbulent conditions if a flowing semi-continuous or continuous or continuous system is being used, which might cause local "hot spots" on "cold spots" on the photochromic material, generally the pressure is maintained only slightly in excess of atmospheric to insure an even flow over the photochromic articles being processed.

The absolute amount of the reducing atmosphere used is obviously decided considering the total number of work pieces to be processed per unit time, and can easily be determined by one skilled in the art by a few trial process runs, e.g., in a flowing gas system generally one would select an appropriate temperature and time of operation and then vary the flow rate of the reducing atmosphere until the desired tint is obtained. For example, in a muffle furnace with a diameter of 2 inches and a length of 8 inches a flow rate of 5 cc/second typically provides excellent results.

The temperature of the reduction process of the present invention is generally from about 300°C. to about 600°C. This range is not limitative, and is set upon a balance of the following factors.

With respect to the minimum temperature, lower temperatures can be used. However, with decreasing temperatures longer times are required for the reduction process of the present invention and such is economically unpractical. At decreasingly lower temperatures, the thermal effects become lessened and the inherent photon activity of the photochromic material begins to predominate. As temperatures increasingly approach room temperature one does not obtain the permanent tinting effect of the present invention but, rather, obtains only a semi-permanent effect which will soon disappear. Experimentation to date has not indicated any abrupt discontinuity in the reduction effect obtained in accordance with the present invention, rather, there is a gradual fall-off in the tinting effect as temperatures become lower than about 300°C..

The maximum temperature is established primarily by the softening point of the photochromic article being processed. Generally, any excessive softening in the photochromic article will lead to a distortion of the shape thereof and, accordingly, a significant loss in commercial value. Since many photochromic glasses will tend to soften in the area of 600°C., this is a practical working maximum for the process of the present invention. If one was altering the tint of a photochromic float glass, of course, in such a case it would be permissible to operate at higher temperatures.

The general rule with plastic photochromic materials is that operation should be near the lower part of the above range since such materials typically show a tendency to soften at rather low temperatures.

The time of the reduction process of the present invention is, of course, interdependent with the temperature of the reduction process of the present invention. If all other conditions are constant, the general rule is that at higher temperatures lesser processing times are required and at lower temperatures greater processing times are required. For many photochromic materials processing at about 300°C. for about 15 minutes will provide excellent results while increasing the temperature to about 600°C. will enable processing to be completed in about 4 to 5 minutes. For example, such times are most successfully used for materials as are disclosed in the Armistead et al, Stookey and like patents earlier incorporated by reference.

Increasing the temperature and/or time of processing increases the degree of tinting or color change effect obtained in accordance with the present invention, with decreasing temperatures and/or times lessening the degree of tinting or color change effect. Usually a few process runs are conducted with time the variable until the desired degree of tinting is obtained. If excessive times are necessary, the time can be decreased and temperature increased to obtain the desired tint. Obviously, both parameters can be simultaneously varied, if desired.

Two caveats should be noted regarding the temperature and time of processing, however. If temperature and/or time is too low, a deeper tint than that of the starting photochromic material is achieved, of course, but the degree of tinting may be too slight to be easily visible to the naked eye. On the other hand, if temperature and/or time is too high, all of the photochromic "element" in the photochromic material would be reduced, and one would be "over tinting," thereby losing the photochromic effect. While in many instances there will be no objection to partially decreasing the photochromic effect, there would be no gain in destroying all photochromic activity. One should, of course, avoid reaction conditions which are so severe that oxides in photochromic glasses are reduced.

One general consideration with processing in accordance with the present invention relates to the thickness of the photochromic article being treated. The general rule is that the thicker the photochromic article the longer the time of processing and/or the higher the temperature of processing must be, generally time being the variable. The reason for this is that it appears, from results to date, that some type of diffusion effect is involved in the process of the present invention. The longer the time and/or the higher the temperature of processing, the deeper the "reduction effect" of the present invention penetrates into the photochromic material and the deeper the tint obtained.

Since a dark to light gradient of the tinting effect in accordance with the present invention is encountered from the surface of the photochromic article into the interior of the photochromic article, it will be appreciated that the present invention finds particular application with essentially finished photochromic articles, e.g., ground lenses, ready to install windows and the like. If one were to attempt to process an unfinished material or "blank," generally the amount of grinding required to form a finished article would remove much of the deeper tints obtained in accordance with the present invention. Of course, this effect could be used to obtain photochromic articles ground on one side but not ground on the other side, the ground side illustrating a tint lighter than the unground side. For certain purposes this effect might be very useful.

In accordance with the present invention one is able to take a photochromic article and vary the tint thereof over a wide range, for example, from light pink at low processing times and/or low processing temperatures through yellow to light brown to deep brown at high processing times and/or high processing temperatures.

The following specific examples illustrate preferred modes of practicing the present invention. These examples should not be taken as limitative on the present invention.

EXAMPLE 1

In this example, photochromic glass lenses to be used in eyeglasses were subjected to the reduction treatment of the present invention. The individual lenses were substantially transparent, circular, 80 millimeters in diameter and had a thickness of one-fourth inch.

The photochromic lenses were formed from a photochromic glass as disclosed in U.S. Pat. No. 3,280,860 (Armistead et al), which had the following composition:

| Component | Percent by Weight (Approx.) |
|---|---|
| $SiO_2$ | 55.9 |
| $Al_2O_3$ | 9.0 |
| $B_2O_3$ | 16.2 |
| LiO | 2.65 |
| NaO | 1.85 |
| PbO | 5.05 |
| BaO | 6.7 |
| ZrO | 2.3 |
| Ag | 0.16 |
| Cl | 0.29 |
| Br | 0.72 |
| CuO | 0.036 |
| F | 0.2 |

For purposes of this example, two such lenses were placed on a stainless steel mesh support and inserted into a muffle furnace 4 inches in diameter and 12 inches in length. The muffle furnace was provided with a constant temperature zone at the center thereof maintained at a temperature of about 450°C..

The muffle furnace had been purged with a 5% hydrogen/95% nitrogen (volume) flowing gas stream prior to the insertion of the lenses into the muffle furnace.

While maintaining the temperature of the center of the muffle furnace containing the lenses at 450°C., the gaseous reducing atmosphere described above was flowed over the lenses for 8 minutes at a flow rate of 5 cc/second with a pressure slightly in excess of the atmospheric pressure.

After 8 minutes the lenses were removed from the muffle furnace and permitted to cool naturally to room temperature.

Subsequent examination showed that the originally substantially transparent lenses now had a yellow tint which was permanent and which did not interfere in any manner with the photochromic properties of the untreated glass lenses.

These glass lenses could be used with excellent results as shooter's glasses.

EXAMPLE 2

The procedure of Example 1 was duplicated except for maintaining the temperature of the center of the muffle furnace at 500°C. and treating for 12 minutes. The lenses illustrated a deeper yellow tint than was exhibited by the lenses in Example 1.

EXAMPLE 3

The procedure of Example 1 was duplicated except for maintaining the temperature in the center of the muffle furnace at 600°C. and processing for 12 minutes as in Example 1. The lenses at the completion of processing exhibited a dark brownish tint.

In all cases, the photochromic properties of the glasses were not degraded in any substantial manner and yet the tinting effect of the present invention was achieved.

This result is illustrated by the attached figure which is a plot of percent transmittance against the wavelength of light irradiated on two identical glass samples as described in Example 1, one treated in accordance with the present invention (Curve B) and one not so treated (Curve A). While the treated glass illustrated a deep yellow tone the untreated glass was substantially transparent. Reference to the figure shows that the photochromic characteristics of both glasses were substantially identical.

While the invention has been particularly shown and described with reference to preferred embodiments thereof, it will be understood by those skilled in the art that various changes in form and details may be made therein without departing from the spirit and scope of the invention.

What is claimed is:

1. A process for changing the tint of a photochromic inorganic silicate glass article containing microscopic particles of silver halide without adverse effect on photochromic properties which comprises the steps of heating the article to a temperature of at least about 300°C to about 600°C for a time from about 4 minutes to about 15 minutes in a reducing atmosphere having a free energy of formation greater that about 1½ to about 2 electron volts to permanently achieve the tint alteration.

2. The process of claim 1, wherein the reducing atmosphere comprises hydrogen.

3. The process of claim 2, wherein the reducing atmosphere further comprises an inert carrier gas.

4. The process of claim 3, wherein the inert carrier gas is nitrogen.

5. A tinted photochromic article produced by the process of claim 1.

6. The process of claim 1 wherein the tint of the photochromic article is darkened by the process.

7. The process of claim 6 wherein the final tint is pink.

8. The process of claim 6 wherein the final tint is yellow.

9. The process of claim 6 wherein the final tint is brown.

10. The process of claim 1 wherein said reducing gas is selected from the group consisting of hydrogen, carbon monixide and cracked ammonia.

* * * * *